United States Patent
Seem (10) Patent No.: US 8,412,357 B2
(45) Date of Patent: Apr. 2, 2013

(54) PROCESS CONTROL SYSTEMS AND METHODS HAVING LEARNING FEATURES

(75) Inventor: John E. Seem, Glendale, WI (US)

(73) Assignee: Johnson Controls Technology Company, Holland, MI (US)

( * ) Notice: Subject to any disclaimer, the term of this patent is extended or adjusted under 35 U.S.C. 154(b) by 193 days.

(21) Appl. No.: 12/953,283

(22) Filed: Nov. 23, 2010

(65) Prior Publication Data

US 2011/0276180 A1    Nov. 10, 2011

Related U.S. Application Data

(63) Continuation-in-part of application No. 12/777,097, filed on May 10, 2010.

(51) Int. Cl.
*G06F 19/00* (2011.01)

(52) U.S. Cl. .................. 700/38; 700/28; 700/43; 702/85

(58) Field of Classification Search .................... 700/28, 700/31–33, 37, 43, 275–274; 318/609; 62/305, 62/39, 184, 186; 702/85
See application file for complete search history.

(56) References Cited

U.S. PATENT DOCUMENTS

| | | | | |
|---|---|---|---|---|
| 4,085,594 A | * | 4/1978 | Mayer | 62/171 |
| 4,199,101 A | | 4/1980 | Bramow et al. | |
| 4,257,238 A | | 3/1981 | Kountz et al. | |
| 4,319,461 A | | 3/1982 | Shaw | |
| 4,474,027 A | * | 10/1984 | Kaya et al. | 62/171 |
| 4,507,930 A | * | 4/1985 | Kaya et al. | 62/129 |
| 4,512,161 A | | 4/1985 | Logan et al. | |
| 4,876,858 A | | 10/1989 | Shaw et al. | |
| 4,942,740 A | | 7/1990 | Shaw et al. | |
| 5,040,377 A | * | 8/1991 | Braun et al. | 62/183 |
| 5,346,129 A | | 9/1994 | Shah et al. | |
| 5,355,305 A | | 10/1994 | Seem et al. | |
| 5,414,640 A | | 5/1995 | Seem | |
| 5,461,877 A | | 10/1995 | Shaw et al. | |
| 5,506,768 A | | 4/1996 | Seem et al. | |
| 5,515,265 A | | 5/1996 | Van As et al. | |
| 5,555,195 A | | 9/1996 | Jensen et al. | |
| 5,568,377 A | | 10/1996 | Seem et al. | |
| 5,590,830 A | | 1/1997 | Kettler et al. | |
| 5,600,960 A | * | 2/1997 | Schwedler et al. | 62/99 |
| 5,682,329 A | | 10/1997 | Seem et al. | |
| 5,791,408 A | | 8/1998 | Seem | |
| 5,867,384 A | | 2/1999 | Drees et al. | |

(Continued)

FOREIGN PATENT DOCUMENTS

| | | |
|---|---|---|
| SU | 535103 A | 11/1976 |
| WO | WO 00/68744 A1 | 11/2000 |

(Continued)

OTHER PUBLICATIONS

Adetola et al., Adaptive Extremum-Seeking Receding Horizon Control of Nonlinear Systems, American Control Conference Proceedings, 2004, pp. 2937-2942.

(Continued)

*Primary Examiner* — Kidest Bahta
(74) *Attorney, Agent, or Firm* — Foley & Lardner LLP (57) ABSTRACT

A system for operating a process includes a processing circuit that uses a self-optimizing control strategy to learn a steady-state relationship between an input and an output. The processing circuit is configured to switch from using the self-optimizing control strategy to using a different control strategy that operates based on the learned steady-state relationship.

5 Claims, 5 Drawing Sheets

U.S. PATENT DOCUMENTS

| | | | |
|---|---|---|---|
| 6,006,142 | A | 12/1999 | Seem et al. |
| 6,122,605 | A | 9/2000 | Drees et al. |
| 6,219,590 | B1 | 4/2001 | Bernaden, III et al. |
| 6,223,544 | B1 | 5/2001 | Seem |
| 6,265,843 | B1 | 7/2001 | West et al. |
| 6,269,650 | B1 | 8/2001 | Shaw |
| 6,296,193 | B1 | 10/2001 | West et al. |
| 6,326,758 | B1 | 12/2001 | Discenzo |
| 6,369,716 | B1 | 4/2002 | Abbas et al. |
| 6,389,331 | B1 | 5/2002 | Jensen et al. |
| 6,408,228 | B1 | 6/2002 | Seem et al. |
| 6,415,617 | B1 | 7/2002 | Seem |
| 6,446,448 | B1 * | 9/2002 | Wang et al. ............... 62/183 |
| 6,446,941 | B1 * | 9/2002 | Maheshwari et al. ........ 261/130 |
| 6,477,439 | B1 | 11/2002 | Bernaden, III et al. |
| 6,594,554 | B1 | 7/2003 | Seem et al. |
| 6,718,779 | B1 * | 4/2004 | Henry .......................... 62/183 |
| 6,816,811 | B2 | 11/2004 | Seem |
| 6,862,540 | B1 | 3/2005 | Welch et al. |
| 6,879,881 | B1 | 4/2005 | Attridge, Jr. |
| 6,937,909 | B2 | 8/2005 | Seem |
| 7,031,880 | B1 | 4/2006 | Seem et al. |
| 7,124,637 | B2 | 10/2006 | Singhal et al. |
| 7,805,952 | B1 | 10/2010 | Zugibe et al. |
| 7,827,813 | B2 | 11/2010 | Seem |
| 2004/0164690 | A1 | 8/2004 | Degner et al. |
| 2005/0006488 | A1 | 1/2005 | Stanimirovic |
| 2005/0040250 | A1 | 2/2005 | Wruck |
| 2006/0090467 | A1 | 5/2006 | Crow |
| 2006/0259285 | A1 | 11/2006 | Bahel et al. |
| 2008/0148767 | A1 | 6/2008 | De Larminat et al. |
| 2008/0179408 | A1 | 7/2008 | De Laminat et al. |
| 2008/0179409 | A1 | 7/2008 | Seem |
| 2010/0006265 | A1 | 1/2010 | De Larminat et al. |

FOREIGN PATENT DOCUMENTS

| | | |
|---|---|---|
| WO | WO 2009/012269 A2 | 1/2009 |
| WO | WO 2009/012282 A2 | 1/2009 |

OTHER PUBLICATIONS

Adetola et al., Adaptive output feedback extremum seeking receding horizon control of linear systems, ScienceDirect, Elsevier, Journal of Process Control, 2006, pp. 521-533, vol. 16.

Adetola et al., Parameter convergence in adaptive extremum-seeking control, ScienceDirect, Elsevier, automatica, available online Sep. 28, 2006, pp. 105-110, vol. 43.

Ariyur et al., Analysis and Design of Multivariable Extremum Seeking, Proceedings of the American Control Conference, Anchorage, Alaska, May 8-10, 2002, pp. 2903-2908.

Ariyur et al., Multivariable Extremum Seeking Feedback: Analysis and Design, see IDS for date information, pp. 1-15.

Ariyur et al., Slope Seeking and Application to Compressor Instability Control, Proceeding of the 41st IEEE Conference on Decision and Control, Las Vegas, Nevada, Dec. 2002, pp. 3690-3697.

Ariyur et al., Slope seeking: a generalization of extremum seeking, International Journal of Adaptive Control and Signal Processing, 2004, pp. 1-22, vol. 18.

Ashrae Standard, Energy Standard for Buildings Except Low-Rise Residential Buildings, ANSI/ASHRAE/IESNA Standard 90.1-2004, cover page and pp. 36-38.

Ashrae Standard, Chapter 41, Supervisory Control Strategies and Tools: Cooling Tower Fan Control, 2007 ASHRAE Handbook, SI Edition, 9 pages.

Astrom et al., Optimalizing Control, Adaptive Control Second Edition, 1995, pp. 214-230, Addison-Wesley Publishing Company, USA.

Banaszuk et al., Adaptive Control of Combustion Instability Using Extremum-Seeking, Proceedings of the American Control Conference, Chicago, Illinois, Jun. 2000, pp. 416-422.

Banavar et al., Functional Feedback in an Extremum Seeking Loop, Proceedings of the 40th IEEE Conference on Decision and Control, Orlando, Florida, Dec. 2001, pp. 1316-1321.

Banavar, R.N., Extremum seeking loops with quadratic functions: estimation and control, International Journal of Control, 2003, pp. 1475-1482, vol. 76, No. 14.

Beaudoin et al., Bluff-body drag reduction by extremum-seeking control, Journal of Fluids and Structures, 2006, pp. 973-978, vol. 22.

Binetti et al., Control of Formation Flight via Extremum Seeking, Proceedings of the American Control Conference, Anchorage, Alaska, May 8-10, 2002, pp. 2848-2853.

Blackman, Extremum-Seeking Regulators, An Exposition of Adaptive Control, Pergamon Press, 1962, 17 pages.

Brandemuehl et al., Implementation of On-Line Optimal Supervisory Control of Cooling Plants Without Storage, Joint Center for Energy Management, University of Colorado, May 1998, 149 pages.

Cowan, Review of Recent Commercial Roof Top Unit Field Studies in the Pacific Northwest and California, report for Northwest Power and Conservation Council and Regional Technical Forum, Oct. 8, 2004, 18 pages.

DOE Federal Emergency Management Program, Actions You Can Take to Reduce Cooling Costs, taken from http://www1.eere.energy.gov/femp/pdfs/om_cooling.pdf, believed to be available May 2005, 8 pages.

Drakunov et al., ABS Control Using Optimum Search via Sliding Modes, IEEE Transactions on Control Systems Technology, Mar. 1995, pp. 79-85, vol. 3, No. 1.

Financial Times Energy, Inc. Economizers, Energy Design Resources, taken from http://www.energydesignresources.com/resource/28/, believed to be available by.

Guay et al., Adaptive extremum seeking control of nonlinear dynamic systems with parametric uncertainities, ScienceDiet, Pergamon, Automatica, 2003, pp. 1283-1293.

International Search Report and Written Opinion for International Patent Application No. PCT/US2008/070091, mailed Sep. 30, 2009, 13 pages.

International Search Report and Written Opinion for International Patent Application No. PCT/US2008/070118, mailed Oct. 19, 2009, 11 pages.

Killingsworth et la., PID Turning Using Extremum Seeking, IEEE Control Systems Magazine, Feb. 2006, pp. 70-79.

Krstic et al., Stability of extremum seeking feedback for general nonlinear dynamic systems, Automatica, Mar. 1997, vol. 36, pp. 595-601.

Krstic, Extremum Seeking Control for Discrete-Time Systems; IEEE Transactions on Automatic Control, University of California Postprints, 2002, 8 pages.

Krstic, Miroslav, Performance improvement and limitations in extremum seeking control, Dec. 1998, pp. 313-326, Department of Mechanical and Aerospace Engineering, University of California, San Diego, La Jolla, CA, USA.

Larsson, Stefan, Literature Study on Extremum Control, Control and Automation Laboratory, Nov. 2001, pp. 1-14, Department of Signals and Systems, Chalmers University of Technology.

Leblanc, Sur l'electrification des Chemins de fer au Moyen de Courants Alternatifs de Frequence Elevee, Revue Generale de l'Electricite, 1922, 4 pages.

Leyva et al., MPPT of Photovoltaic Systems using Extremum-Seeking Control, IEEE Transactions on Aerospace and Electronic Systems, Jan. 2006, vol. 42, No. 1, pp. 249-258.

Li et al., Extremum Seeking Control of a Tunable Thermoacoustic Cooler, IEEE Transactions on Control Systems Technology, Jul. 2005, pp. 527-536, vol. 13, No. 4.

Liu et al., Extremum-seeking with variable gain control for intensifying biogas production in anaerobic fermentation, Water Science & Technology, 2006, vol. 53, No. 4-5, pp. 35-44.

Lu et al., Global Optimization for Overall HVAC Systems—Part I Problem Formulation and Analysis, Energy Conversion and Management, 46, 2005, pp. 999-1014.

Ma et al., Online Performance Evaluation of Alternative Control Strategies for Building Cooling Water Systems Prior to in situ Implementation, Applied Energy, 86, 2009, pp. 712-721.

Marcos et al., Adaptive extremum-seeking control of a continuous stirred tank bioreactor with Haldane's Kinetics, Journal of Process Control, 2004, vol. 14, pp. 317-328.

Office Action for U.S. Appl. No. 11/699,859, dated Mar. 15, 2010, 12 pages.
Office Action for U.S. Appl. No. 11/699,860, dated Aug. 20, 2009, 18 pages.
Pan et al., Discrete-Time Extremum Seeking Algorithms, Proceedings of American Control Conference, Anchorage, Alaska, May 2002, pp. 3753-3758.
Popovic et al., Extremum seeking methods for optimzation of variable cam timing engine operation, Proceedings of the American Control Conference, Jun. 4-6, 2003, Denver, CO, USA, pp. 3136-3141.
Rotea, Analysis of Multivariable Extremum Seeking Algorithms, Proceedings of the American Control Conference, pp. 433-437, Jun. 2000, Chicago, IL, USA.
Salsbury, A Controller for HVAC Systems with Embedded Fault Detection Capabilities Based on Simulation Models, presented at the International Building Simulation Conference in Kyoto, Japan, Sep. 1999, 8 pages.
Sane et al., Building HVAC Control Systems—Role of Controls and Optimization, Proceedings of the American Control Conference Minneapolis, Minnesota, Jun. 14-16, 2006, 6 pages.
Speyer et al., Extremum Seeking Loops with Assumed Functions, Proceedings of the 39th IEEE Conference on Decision and Control, Sydney, Australia, Dec. 2000, pp. 142-147.
Sternby, Extremum Control Systems—An Area for Adaptive Control?, see IDS for date information, 12 pages, Department of Automatic Control, Lund Institute of Technology, Lund, Sweden.
Teel et al., Solving Smooth and Nonsmooth Multivariable Extremum Seeking Problems by the Methods of Nonlinear Programming, Proceedings of American Control Conference, Arlington, Virginia, Jun. 2001, 8 pages.
Teel, Lyapunov Methods in Nonsmooth Optimization, Part I: Quasi-Newton Algorithms for Lipschitz, Regular Functions, Proceedings of the 39th IEEE Conference on Decision and Control, Sydney, Australia, Dec. 2000, 8 pages.
Teel, Lyapunov Methods in Nonsmooth Optimization, Part II: Persistently Exciting Finite Differences, Proceedings of the 39th IEEE Conference on Decision and Control, Sydney, Australia, Dec. 2000, 8 pages.
Titica et al., Adaptive Extremum Seeking Control of Fed-Batch Bioreactors, European Journal of Control, 2003, pp. 618-631.
Tunay, Antiskid Control for Aircraft via Etremum-Seeking, Proceedings of American Control Conference, Arlington, Virginia, Jun. 2001, 8 pages.
Tyagi et al., An Extremum Seeking Algorithm for Determining the Set Point Temperature for Condensed Water in a Cooling Tower, Proceedings of the 2006 American Control Conference, Minneapolis, MN, Jun. 14-16, 2006, 5 pages.
Walsh, On the Application of Multi-Parameter Extremum Seeking Control, Proceedings of the American Control Conference, pp. 411-415, Jun. 2000, Chicago, IL, USA.
Wang et al., Experimental Application of Extremum Seeking on an Axial-Flow Compressor, IEEE Transactions on Control Systems Technology, Mar. 2000, vol. 8, No. 2, pp. 300-309.
Wang et al., Extremum Seeking for Limit Cycle Minimization, IEEE Transactions on Automatic Control, Dec. 2000, vol. 45, No. 12, pp. 2432-2437.
Wang et al., Optimizing Bioreactors by Extremum Seeking, International Journal of Adaptive Control and Signal Processing, 1999, pp. 651-669.
Yu et al., Extremum-Seeking Control Strategy for ABS System with Time Delay, Proceedings of American Control Conference, Anchorage, Alaska, May 2002, pp. 3753-3758.
Yu et al., Extremum-Seeking Control via Sliding Mode with Periodic Search Signals, Proceedings of the 41st IEEE Conference on Decision and Control, Las Vegas, Nevada, Dec. 2002, pp. 323-328.
Yu et al., Optimization of Water-Cooled Chiller System with Load-Based Speed Control, Applied Energy, 85, 2008, pp. 931-950.
Zhang et al., Extremum-Seeking Nonlinear Controllers for a Human Exercise Machine, IEEE/ASME Transactions on Mechatronics, Apr. 2006, vol. 11, No. 2, pp. 233-240.
Zhang, Stability and Performance Tradeoff with Discrete Time Triangular Search Minimum Seeking, Proceedings of American Control Conference, Chicago, Illinois, Jun. 2000, 7 pages.
Office Action for U.S. Appl. No. 12/777,097, mail date Mar. 28, 2012, 8 pages.

* cited by examiner

FIG. 5B

PROCESS CONTROL SYSTEMS AND METHODS HAVING LEARNING FEATURES

CROSS-REFERENCE TO RELATED APPLICATIONS

This is a continuation-in-part of Ser. No. 12/777,097, filed May 10, 2010, the entirety of which is hereby incorporated by reference.

BACKGROUND

Self-optimizing control strategies such as extremum seeking control can be effective tools for seeking optimum operating conditions in a process control system. Some loss (e.g., a hunting loss) and equipment wear, however, may be associated with any self-optimizing control strategy that uses a varying signal to conduct the search for optimum operating conditions. It is challenging and difficult to develop robust process control systems and methods.

SUMMARY

One embodiment of the invention relates to a system for operating a process. The system includes a processing circuit that uses a self-optimizing control strategy to learn a steady-state relationship between a manipulated variable and an output variable. The processing circuit is configured to switch from using the self-optimizing control strategy to using a second control strategy that operates based on the learned steady-state relationship.

Another embodiment of the invention relates to a system for operating a process. The system includes a processing circuit. The processing circuit includes at least one sensor input, an extremum seeking controller, and a model-based controller. The processing circuit is configured to switch between using the extremum seeking controller to control the process and using the model-based controller to control the process. The processing circuit is configured to store process characteristics of a steady-state of the extremum seeking controller and the processing circuit is configured to operate the model-based controller using the stored process characteristics.

Another embodiment of the invention relates to a method for operating a process. The method includes using a self-optimizing control strategy to learn a steady-state relationship between measured inputs and outputs that minimizes energy consumption. The method further includes switching from using the self-optimizing control strategy to using an open-loop control strategy that operates based on the learned steady-state relationship between measured inputs and outputs that minimizes energy consumption.

Another embodiment of the invention relates to a method for operating a process. The method includes using a processing circuit to cause an extremum seeking controller to control the process. The method further includes storing process characteristics of a steady-state of the extremum seeking controller in a memory device. The method yet further includes switching from using the extremum seeking controller to control the process to using a model-based controller to control the process. The method also includes operating the model-based controller using the stored process characteristics.

Another embodiment of the invention relates to a method for operating a process. The method includes using a self-optimizing controller to learn a steady state relationship between a manipulated variable and an output variable. The method also includes switching from using the self-optimizing controller to using a second controller that operates based on the learned steady state relationship. The second control strategy may be an open loop control strategy that conducts open loop control based on control variables observed while the process was operating in the learned steady state relationship. The method may further include operating the process using the second controller primarily and operating using the self-optimizing controller periodically. The method can also or alternatively include operating the process using the self-optimizing controller during at least one of a start-up state and a training state of the process. In some embodiments, the method can include detecting whether a steady state has been obtained and learning the steady state relationship between a manipulated variable and an output variable by recording calculated and/or sensed parameters existing during the steady state relationship, the calculated and/or sensed parameters provided to the second controller for operation of a model-based control strategy. The self-optimizing controller may be an extremum seeking controller.

Another embodiment relates to a system for controlling a cooling tower that cools condenser fluid for a condenser of a chiller. The system includes a cooling tower fan system that controllably varies a speed of at least one fan motor. The system further includes an extremum seeking controller that receives inputs of power expended by the cooling tower fan system and of power expended by the chiller. The extremum seeking controller provides an output to the cooling tower fan system that controls the speed of the at least one fan motor. The extremum seeking controller determines the output by searching for a speed of the at least one fan motor that minimizes the sum of the power expended by the cooling tower fan system and the power expended by the chiller. The system further includes a model-based controller for controlling the speed of the at least one fan motor. The system also includes a processing circuit configured to store process characteristics associated with a steady-state of the extremum seeking controller. The processing circuit is further configured to switch from using the extremum seeking controller to using the model-based controller to control the fan speed. The processing circuit operates the model-based controller using the stored process characteristics. The processing circuit may be configured to use the extremum seeking controller during an initial training period. The stored process characteristics associated with the steady state of the extremum seeking controller and used by the model-based controller can include $PLR_{twr,cap}$ (the part-load ratio at which the tower operates at its capacity) and $\beta_{twr}$ (the slope of the relative tower airflow versus the part-load ratio). The processing circuit may be configured to store the maximum part load ratio ($PLR_{max}$) during the training period and the minimum part load ratio ($PLR_{min}$) during the training period. The processing circuit may be configured to monitor the part load ratio during the model-based control and wherein the processing circuit is configured to switch back to using the extremum seeking controller if the part load ratio exceeds $PLR_{max}$ or drops below $PLR_{min}$ during operation using the model-based controller.

Alternative exemplary embodiments relate to other features and combinations of features as may be generally recited in the claims.

BRIEF DESCRIPTION OF THE FIGURES

The disclosure will become more fully understood from the following detailed description, taken in conjunction with the accompanying figures, wherein like reference numerals refer to like elements, in which:

FIGS. 5A-5C relate to a particular implementation for one or more control systems or processes described herein;

DETAILED DESCRIPTION

Before turning to the figures, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Referring generally to the Figures, systems and methods are shown for operating a process. A system includes a processing circuit that uses a self-optimizing control strategy to learn a steady-state relationship between a manipulated variable and an output variable. The processing circuit is configured to switch from using the self-optimizing control strategy to using a different control strategy that operates based on the learned steady-state relationship.

Figure 1:
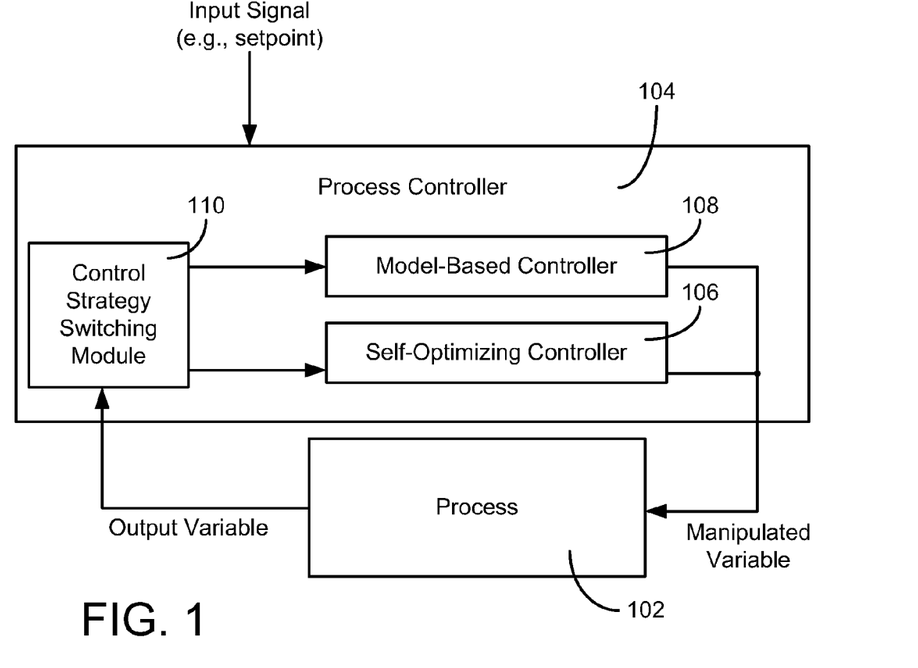
FIG. 1 is a block diagram of a system for operating a process, according to an exemplary embodiment.

Referring now to FIG. 1, a block diagram of a system for operating a process 102 is shown, according to an exemplary embodiment. Process 102 may be any type of process that can be controlled via a process controller. For example, process 102 may be an air handling unit configured to control temperature within a building space. In other embodiments, process 102 can be or include a chiller operation process, a damper adjustment process, a mechanical cooling process, a ventilation process, or any other process where a variable is manipulated to affect a process output or variable.

Process controller 104 operates process 102 by outputting and controllably changing a manipulated variable provided to process 102. An output variable affected by process 102 or observed at process 102 (e.g., via a sensor) is received at process controller 104. Process controller 104 includes logic that adjusts the manipulated variable to achieve a target outcome for process 102 (e.g., a target value for the output variable).

In some control modes, the logic utilized by process controller 104 utilizes feedback of an output variable. The logic utilized by process controller 104 may also or alternatively vary the manipulated variable based on a received input signal (e.g., a setpoint). The setpoint may be received from a user control (e.g., a thermostat), a supervisory controller, or another upstream device.

Process controller 104 is shown to include a self-optimizing controller 106, a model-based controller 108, and a control strategy switching module 110. Self-optimizing controller 106 may be configured to search for values of the manipulated variable that optimize the output variable (i.e., a controlled variable, a measured output variable, a calculated output variable, etc.). In an exemplary embodiment, self-optimizing controller 106 is an extremum seeking control (ESC) module or controller.

Extremum seeking control is a class of self-optimizing control that can dynamically search for the unknown and/or time varying input or inputs of a process to optimize a certain performance index (e.g., approach a target value for one or more output variables). Extremum seeking control can be implemented using gradient searching through the use of dithering signals (e.g., sinusoidal, square-wave, etc.). That is, the gradient of the process's output (e.g., the output variable) with respect to the process's input (e.g., the manipulated variable) is typically obtained by perturbing (e.g., varying in a controlled manner, oscillating, etc.) the manipulated variable and applying a corresponding demodulation on the observed changes in the output variable. Improvement or optimization of system performance is sought by driving the gradient toward zero by using integration. Extremum seeking control is typically considered a non-model based control strategy, meaning that a model for the controlled process is typically not relied upon by the extremum seeking controller to optimize the system. While self-optimizing controller 106 is preferably an extremum seeking controller, in some alternative embodiments self-optimizing controller 106 can use other self-optimizing control strategies. Some embodiments of self-optimizing controller 106 may implement the extremum seeking control systems or methods described in one or more of U.S. application Ser. No. 11/699,589, filed Jan. 30, 2007, U.S. application Ser. No. 11/699,860, filed Jan. 30, 2007, U.S. application Ser. No. 12/323,293, filed Nov. 25, 2008, U.S. application Ser. No. 12/683,883, filed Jan. 7, 2010, and U.S. application Ser. No. 12/650,366, filed July 16.

Figure 2:
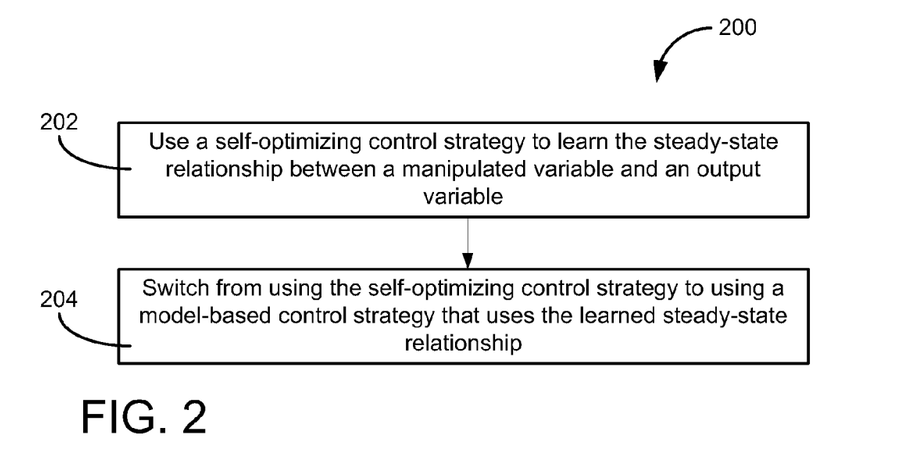
FIG. 2 is a flow chart of a method for operating a process, according to an exemplary embodiment.

Referring now to FIG. 2 in addition to FIG. 1, process controller 104 uses self-optimizing controller 106 to learn a steady-state relationship between a manipulated variable and an output variable (step 202 of process 200). Process controller 104 switches from using a self-optimizing controller 106 to using a model-based controller 108 that uses the learned steady-state relationship (step 204 of process 200).

Learning a steady state relationship can include detecting a steady state condition for process 102 and storing, for example, a manipulated variable that corresponds with a target output variable. In other embodiments, learning a steady state relationship can be or include storing a multiplier, a coefficient, a residual, or another variable or set of variables that describes a determined mathematical relationship between a manipulated variable and an output variable. In yet another example, a table of values around a steady-state operating point may be established for responding to varying input signals or varying process conditions. For example, where the process controller is configured to set an air handling unit damper position to cause a room temperature to approach a setpoint input signal, the process controller 104 can store a matrix that relates a plurality of possible temperatures to damper positions based on a learned steady state relationship. Accordingly, non-linear relationships between the manipulated variable and the output variable may be stored based on steady-state relationships between the two variables. In other embodiments, multiple coefficients of a multi-variable equation describing the relationship between the manipulated variable and the output variable may be determined and stored to describe non-linear steady-state relationships.

The decision to switch from using the self-optimizing controller 106 to using the model-based controller 108 may be completed by control strategy switching module 110 or another logic module of process controller 104.

The model-based controller 108 may be a closed-loop controller, a feedback controller, a feedforward controller, an open-loop controller, or any other controller that uses one or more models to determine control adjustments to the manipulated variable or variables.

Figure 3:
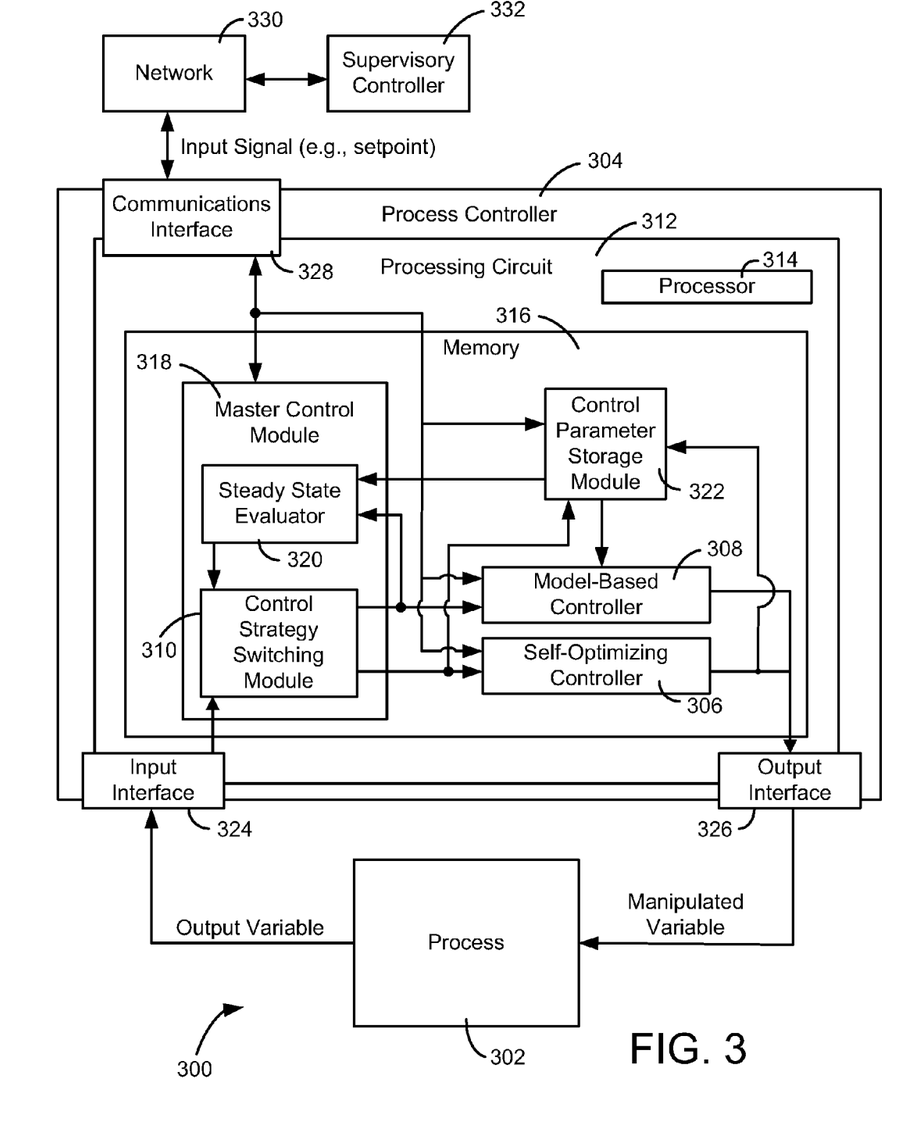
FIG. 3 is a detailed block diagram of a system for operating a process, according to an exemplary embodiment.

Referring now to FIG. 3, a more detailed block diagram of a system 300 for operating a process 302 is shown, according to an exemplary embodiment. Process controller 304 includes a processing circuit 312 that uses a self-optimizing controller 306 to learn a steady state relationship between a manipulated variable and an output variable. The processing circuit 312 is configured to switch from using the self-optimizing controller 306 to using a different control strategy (e.g., that of model-based controller 308) that operates based on the learned steady-state relationship.

Process controller 304 is shown to include processing circuit 312. Processing circuit 312 is shown to include a processor 314 and a memory 316. According to an exemplary embodiment, processor 314 and/or all or parts of processing circuit 312 can be implemented as a general purpose processor, an application specific integrated circuit (ASIC), one or more programmable logic controllers (PLCs), one or more field programmable gate arrays (FPGAs), a group of processing components, one or more digital signal processors, other suitable electronics components, or a combination thereof.

Memory 316 (e.g., memory unit, memory device, storage device, etc.) is one or more devices for storing data and/or computer code for completing and/or facilitating the various processes described in the present disclosure. Memory 316 may be or include volatile memory or non-volatile memory. Memory 316 may include database components, object code components, script components, or any other type of information structure for supporting the various activities described in the present disclosure. According to an exemplary embodiment, memory 316 is communicably connected to processor 314 via processing circuit 312 and includes computer code for executing (e.g., by processor 314) one or more processes described herein. Memory 316 may also include various data regarding the operation of one or more of the control loops relevant to the system (e.g., performance map data, historical data, behavior patterns regarding process behavior, state machine logic, start-up logic, steady-state logic, etc.).

Interfaces 324, 326, 328 may be or include any number of jacks, wire terminals, wire ports, wireless antennas, or other communications interfaces for communicating information or control signals (e.g., a control signal of the manipulated variable output at interface 326, sensor information received at input interface 324, setpoint information received at communications interface 328, etc.). Interfaces 324, 326 may be the same type of devices or different types of devices. For example, input interface 324 may be configured to receive an analog feedback signal (e.g., an output variable, a measured signal, a sensor output, a controlled variable) from a controlled process component (or a sensor thereof) while communications interface 328 may be configured to receive a digital setpoint signal from upstream supervisory controller 332 via network 330. Output interface 326 may be a digital output (e.g., an optical digital interface) configured to provide a digital control signal (e.g., a manipulated variable) to a controlled process component. In other embodiments, output interface 326 is configured to provide an analog output signal. In some embodiments the interfaces can be joined as one or two interfaces rather than three separate interfaces. For example, communications interface 328 and input interface 324 may be combined as one Ethernet interface configured to receive network communications from a supervisory controller. In other words, the supervisory controller may provide both the setpoint and process feedback via an Ethernet network (e.g., network 330). In such an embodiment, output interface 326 may be specialized for the controlled process component of process 302. In yet other embodiments, output interface 326 can be another standardized communications interface for communicating data or control signals. Interfaces 324, 326, 328 can include communications electronics (e.g., receivers, transmitters, transceivers, modulators, demodulators, filters, communications processors, communication logic modules, buffers, decoders, encoders, encryptors, amplifiers, etc.) configured to provide or facilitate the communication of the signals described herein.

Memory 316 includes master control module 318, model-based controller 308, self-optimizing controller 306, and control parameter storage module 322. Master control module 318 may generally be or include software for configuring processing circuit 312 generally and processor 314 particularly to operate process 302 using a self-optimizing control strategy (via self-optimizing controller 306) to learn a steady-state relationship between a manipulated variable and an output variable. Once the relationship is learned or in response to one or more other conditions (e.g., a time expiring), master control module 318 switches control of operation of the process from the self-optimizing control strategy to a different control strategy (e.g., via model-based controller 308). Master control module 318 causes the model-based controller to operate based on the steady-state relationship learned using the self-optimizing controller.

As the self-optimizing controller 306 operates (e.g., seeking optimal values for the manipulated variable), the output variable (and, in some embodiments, any other inputs used by the self-optimizing controller) are provided to control parameter storage module 322. The manipulated variable output from the self-optimizing controller 306 is also provided to control parameter storage module 322.

In some embodiments, control parameter storage module 322 may be configured to store a detailed history of output variable to manipulated variable data sets. For example, control parameter storage module 322 may be configured to store output variable to manipulated variable data pairs with a timestamp on an every-minute basis. In other embodiments, different intervals of control parameter recording may be effected by control parameter storage module 322 (e.g., every second, every ten minutes, hourly, etc.). Control parameter storage module 322 may be configured to store data as it is received. In other embodiments, control parameter storage module 322 may be configured to smooth, average, aggregate, or otherwise transform the data for storage or use. For example, in one embodiment, control parameter module 322 may store an exponentially weighted moving average of output variables and an exponentially weighted moving average of manipulated variables. In some embodiments, other than conducting some basic transformation and storage relative to output variables (or other system inputs) and the manipulated variable, the control parameter storage module 322 does not conduct significant additional processing. In other embodiments, control parameter storage module 322 can further evaluate the received variables or the stored information to build or identify a model for use by the model-based controller 308. For example, the control parameter storage module 322 may be configured to describe the relationship between the output variable and the manipulated variable as a complex expression, as a system of coefficients for an equation, as a coefficient matrix, as a system of rules, or as another model for describing the relationship between the output variable(s) and the manipulated variable. When control of the process 302 is switched from the self-optimizing controller 306 to the model-based controller 308, the control parameter storage module 322 provides stored parameters, coefficients, rules, or other model descriptors to model-based controller 308 so that model-based controller 308 can operate the process 302 using the relationship learned by operation of the process 302 using self-optimizing controller 306.

In the embodiment shown in FIG. 3, master control module 318 includes a steady state evaluator 320 and a control strategy switching module 310. Steady state evaluator 320 is configured to receive parameters from control parameter storage module 322. The steady state evaluator 320 can determine whether the self-optimizing controller 306 has reached a steady state. Steady state evaluator 320 can evaluate a steady state by establishing thresholds and checking for whether control parameters stay within the thresholds for a period of time. In other embodiments, steady state evaluator 320 can wait for a standard deviation of one or more standard deviations of a control parameters to shrink below a certain value, can initiate a timer when the standard deviations first fall below the certain value, and can determine that a steady state condition exists when the timer has elapsed a predetermined amount of time. Steady state evaluator 320 can provide a result of its determination and/or other state describing information to control strategy switching module 310. In an exemplary embodiment, control strategy switching module 310 causes and coordinates the switch between self-optimizing controller 306 and model-based controller 308. Control strategy switching module 310 can wait a predetermined (or random, quasi-random) period of time after steady state evaluator 320 indicates a steady state to effect a switch from self-optimizing controller 306 to model-based controller 308.

Control strategy switching module 310 can cause the switch from self-optimizing controller 306 to model-based controller 308 via an instant or hard switch. For example, for a first time period the process 302 may be entirely controlled by self-optimizing controller 306 and in a second time period the process 302 is entirely controlled by model-based controller 308. In another embodiment, the control strategy switching module 310 may be configured to include one or more logic mechanisms for smoothing the switch from one controller to another controller. In one such example, the control strategy switching module 310 may restrict output from model-based controller 308 but may begin providing inputs to model-based controller 308 some seconds or minutes early.

In an alternative embodiment to that shown in FIG. 3, control strategy switching module 310 and master control module 318 may be located downstream of model-based controller 308 and self-optimizing controller 306. In such embodiments, control strategy switching module 310 may be configured to average, blend, or otherwise smooth the transition of control from one controller to the other controller.

In some embodiments, steady state evaluator 320 and control strategy switching module 310 are configured to cause control to be switched back to self-optimizing controller 306 from model-based controller 308. For example, steady state evaluator 320 may be configured to receive the same inputs that are being provided to model-based controller 308. If process 302 changes such that the inputs to model-based controller 308 begin significantly changing, steady state evaluator 320 can communicate such a change to control strategy switching module 310. Control strategy switching module 310, in response to such a communication, can then cause self-optimizing controller 306 to resume control of the process 302 and for model-based controller 308 to discontinue control. Control strategy switching module 310 may then cause self-optimizing controller 306 to operate until a new steady state is detected by steady state evaluator 320. This cycle may operate continuously. In other words, control strategy switching module 310 can cause self-optimizing controller 306 to seek optimal manipulated variable to output variable relationships until the process 302 is in or is brought to a steady state. Once a steady state is detected and a control relationship between the manipulated variable and the control variable is learned by the self-optimizing controller 306 and stored in control parameter storage module 322, the model-based controller 308 conducts control. When a condition is detected (e.g., a power outage, a restart, a significantly different setpoint, an unstable process condition, deviation from steady state boundaries, etc.), the method repeats with self-optimizing controller 306 again conducting its seeking and learning behaviors. During times when the model-based controller 308 is operating process 302, the process components may advantageously be subjected to less energy loss and less equipment wear as compared to a self-optimizing controller that constantly oscillates the manipulated variable (and therefore process equipment) to seek optimal parameters.

While in some embodiments control strategy switching module 310 may only switch back to operation using self-optimizing controller 306 when a steady state is no longer active, in other embodiments the control strategy switching module 310 may periodically cause control to be switched back to the self-optimizing controller 306 from the model-based controller 308. Operation by the self-optimizing controller 306 can be used to help determine whether a steady state still exists or can be used to determine whether performance of process 302 has changed. Operating self-optimizing controller 306 may allow control strategy switching module 310 to determine that process 302 performance has shifted or otherwise changed. In other words, the relationship that was originally learned between a manipulated variable and one or more output variables may no longer be true or optimal. In yet other embodiments, periodic control by self-optimizing controller 306 can be used to detect faults in the process 302. For example, if a newly detected relationship between an optimal manipulated variable and the output variable indicates a significant change from a steady state or fault free state known to previously exist, the master control module 318 may cause a fault alert and/or send related fault information to supervisory controller 332 via network 330. Such information may be used to display fault information or alerts to a user via an electronic display or other user interface device. The user may then be able to check into and resolve the fault rather than allowing control to be learned relative to a faulty state. Advantageously, however, periodic learning provided by self-optimizing controller 306 may allow relatively optimal process system performance given the fault. In a system which operates only on a fixed model, changed circumstances can result in an incorrect model and highly undesirable results. A model learned by systems and methods of the present application can be optimal given even undesirable circumstances.

Figure 4:
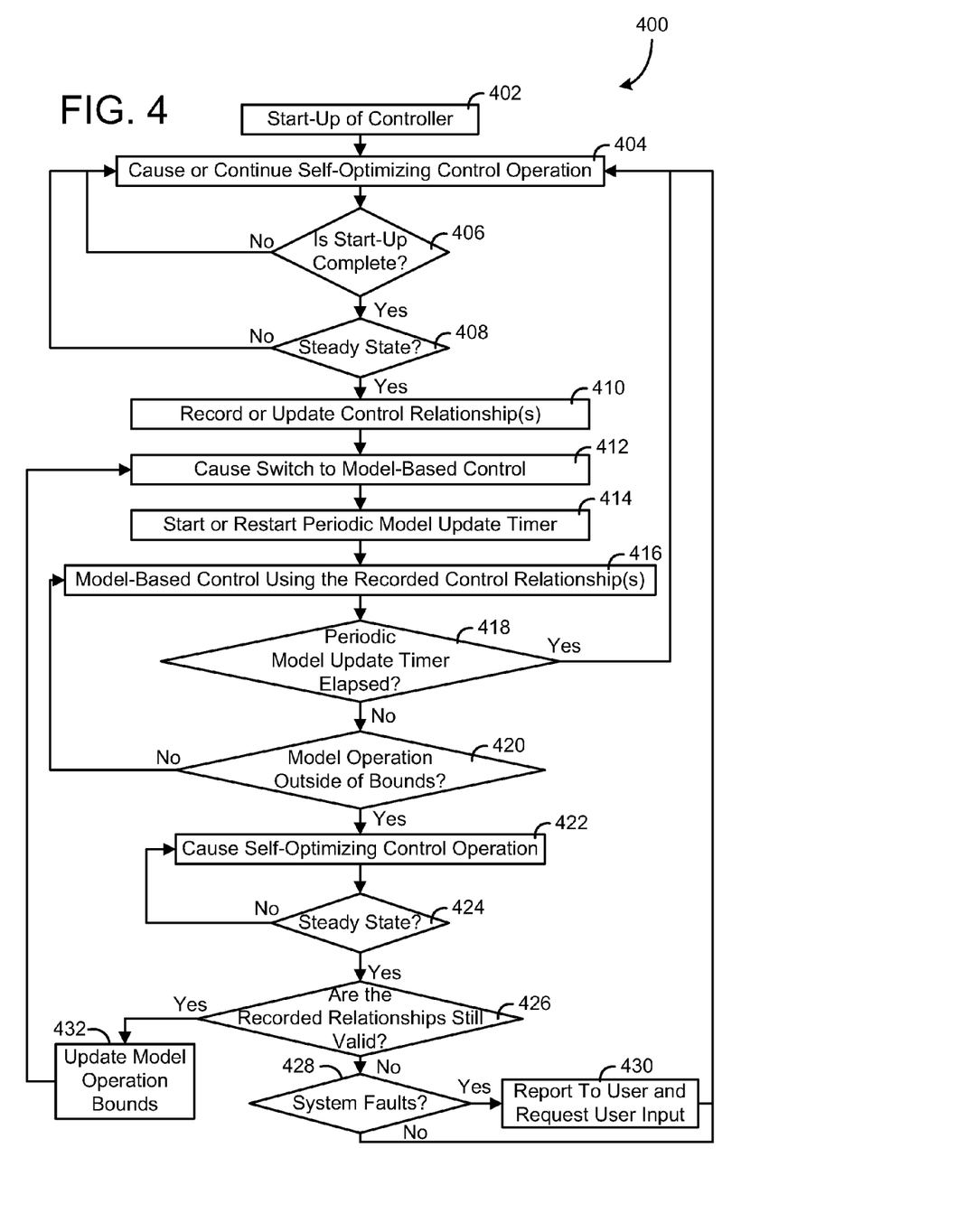
FIG. 4 is a detailed flow chart of a method for operating a process, according to an exemplary embodiment.

Referring now to FIG. 4, a detailed flow chart of a method 400 for operating a process system is shown, according to an exemplary embodiment. Method 400 includes starting-up a controller (step 402). Starting-up of the controller may include one or more variable initiation tasks, timer initiation tasks, feedback tasks, diagnostics tasks, or other control tasks. The start-up routine may include or be followed by causing self-optimizing control operation of the controlled process system (step 404). According to varying exemplary embodiments, the self-optimizing control operation may be an extremum seeking control operation. Method 400 includes checking whether start-up is complete (step 406). Checking whether start-up is complete can include determining whether a start-up timer has elapsed, checking for whether a set of post start-up conditions have been met, checking for whether a start-up routine has successfully completed, or otherwise. If start-up is completed, the method moves on to the next step. If start-up is not complete, the controller continues self-optimizing control operation until start-up is complete.

Method 400 further includes determining whether a steady state has been attained by the self-optimizing control or the process system that the self-optimizing control is controlling (step 408). Determining whether a steady state has been attained by the self-optimizing control can include determining whether the manipulated variable is making steps or sinusoidal changes above a certain amplitude and/or frequency, determining whether the output variable is within a certain range, determining whether relationships identified during the self-optimizing control fit a post start-up model, or conducting any other control or decision task relevant in determining whether a steady state has been attained. If the system has not reached a steady state, the controller continues self-optimizing control operation until a steady state is attained.

When step 408 results in a determination that a steady state has been reached, the controller then records or updates one or more control relationships in memory (step 410). Recording or updating of control relationships can continuously occur when self-optimizing control is operating the process system. For example, new manipulated variable to output variable relationships or values for describing the relationships may be updated in memory for every regular time period of the process controller or process being controlled. Updating in memory may include replacing previous variables, updating a moving average, or other tasks that may help the controller more accurately or reliably describe a relationship observed during the self-optimizing control process. In some embodiments, steps 404 through 410 can be considered a training period for the model-based control using a self-optimizing control loop as the training mechanism.

Method 400 further includes causing a switch to the model-based control for operation of the process system (step 412). The switch from the self-optimizing control to the model-based control may be as described above with reference to control strategy switching module 110 shown in FIG. 1, as described above with reference to control strategy switching module 310 shown in FIG. 3, or completed by another control strategy switching module or mechanism.

When the switch to the model-based control is effected, method 400 can start or restart a periodic model update timer (step 414). The periodic model update timer is used later in the method to determine whether to switch back to the self-optimizing control for a control model update. In varying alternative embodiments, method 400 may not utilize periodic model updating, step 414, or a periodic model update timer. In other embodiments, the periodic model update timer may be user adjustable and set to zero to disable the feature. In an exemplary embodiment, the periodic model update timer may initially be set for a relatively small period of time (e.g., 30 minutes). If the model observed by the self-optimizing controller is determined to be relatively accurate in finding an accurate control model from self-optimizing control cycle to self-optimizing control cycle, the controller may be configured to automatically begin lengthening the periodic model update timer (e.g., in ten minute increments, in half-hour increments, in hour long increments, etc.). For example, if the model is substantially unchanged from one self-optimizing control cycle to another, a periodic model update timer that is initially set to 45 minutes may eventually allow the model-based control to operate for four hour periods of time before a "refresh" or update by the self-optimizing controller.

Model-based control using the recorded control relationship or relationships continues or begins at step 416. As described above, the model-based control can be feedforward-based, feedback-based, an open loop control strategy, or another model-based control strategy.

When the model-based control is operating, the method includes determining whether the periodic model update timer has elapsed (step 418). If the periodic update time has elapsed, the controller loops back to step 404 and again causes self-optimizing control to operate the process system and to record or update control models or relationships (at step 410).

If the periodic model update timer has not elapsed, method 400 determines whether operation of the model-based control strategy has moved out of one or more control boundaries (step 420). The control boundary may be or include a threshold value for the output variable, a threshold value for the manipulated variable, one or more other thresholds relating to a relationship between the manipulated variable and the output variable, one or more coefficients describing a relationship between the manipulated variable and the output variable, a performance index parameter threshold, or another control boundary suitable for determining whether the model operation has continued within a desired range or bounds. If the model operation is not outside of some boundary, then the model-based control using the recorded control relationships continues at step 416.

When the model operation is determined to be outside of bounds at step 420, the controller can then cause a switch to self-optimizing control operation (step 422). After some period of time, the controller can then determine whether the self-optimizing control operation has reached a steady state (step 424). If the self-optimizing control operation has not reached a steady state, then the self-optimizing control continues at step 422. When a steady state has been determined at step 424, method 400 proceeds to determine whether the recorded relationships are still valid (step 426) (e.g., the relationships recorded at step 410). Determining whether the recorded relationships are still valid can include comparing coefficient values of an equation describing the relationships, comparing a sensor-obtained measurement to a setpoint, or conducting a number of other comparing, computing, or logic tasks.

If the recorded relationships are determined not to be valid, then the controller determines whether one or more system faults have occurred (step 428). Determining whether one or more system faults have occurred can include further evaluation of self-optimizing control states or relationships, performance indexes, measures sensor values, comparison of one or more variables to one or more rules, or other analysis, computing, or determining tasks. If a system fault is detected at step 428, then the system reports the fault to the user and requests user input (step 430). Simple inspection or cleaning of the device may resolve the fault or faults. If more complex fault analysis is required, the user may take the system offline and restart the controller and method at step 402. Due to the learning capabilities of the system, the self-optimizing control operation can record new relationship models for any new system performance realities (e.g., at step 410) prior to operation by a model-based control strategy. If the controller determines that there are not system faults that need to be reported to a user or otherwise addressed, the method loops back to step 404 and causes or continues self-optimizing control operation such that control relationship models are recorded or updated at step 410.

If the recorded relationships are determined to be valid at step 426, the controller may then update model operation bounds (step 432). Step 432 can include widening the bounds or otherwise making step 420 less restrictive. In an exemplary embodiment, the bounds can be narrowed after step 428 (e.g., in situations where the model-operation was determined to be within the established bounds but the relationships were found to be invalid). Once the bounds are updated (e.g., widened, made less restrictive, etc.) in step 432, method 400 loops back to step 412, causing a switch to model-based control using the updated bounds. Adjusting the bounds to be more or less restrictive can advantageously adaptively the amount of time the system spends using self-optimizing control versus model-based control (e.g., by widening bounds in response to a determination that the model learned by the self-optimizing control is still good, the system can learn to operate the model-based control for a longer period of time before resorting back to self-optimizing control.

Figure 5A:
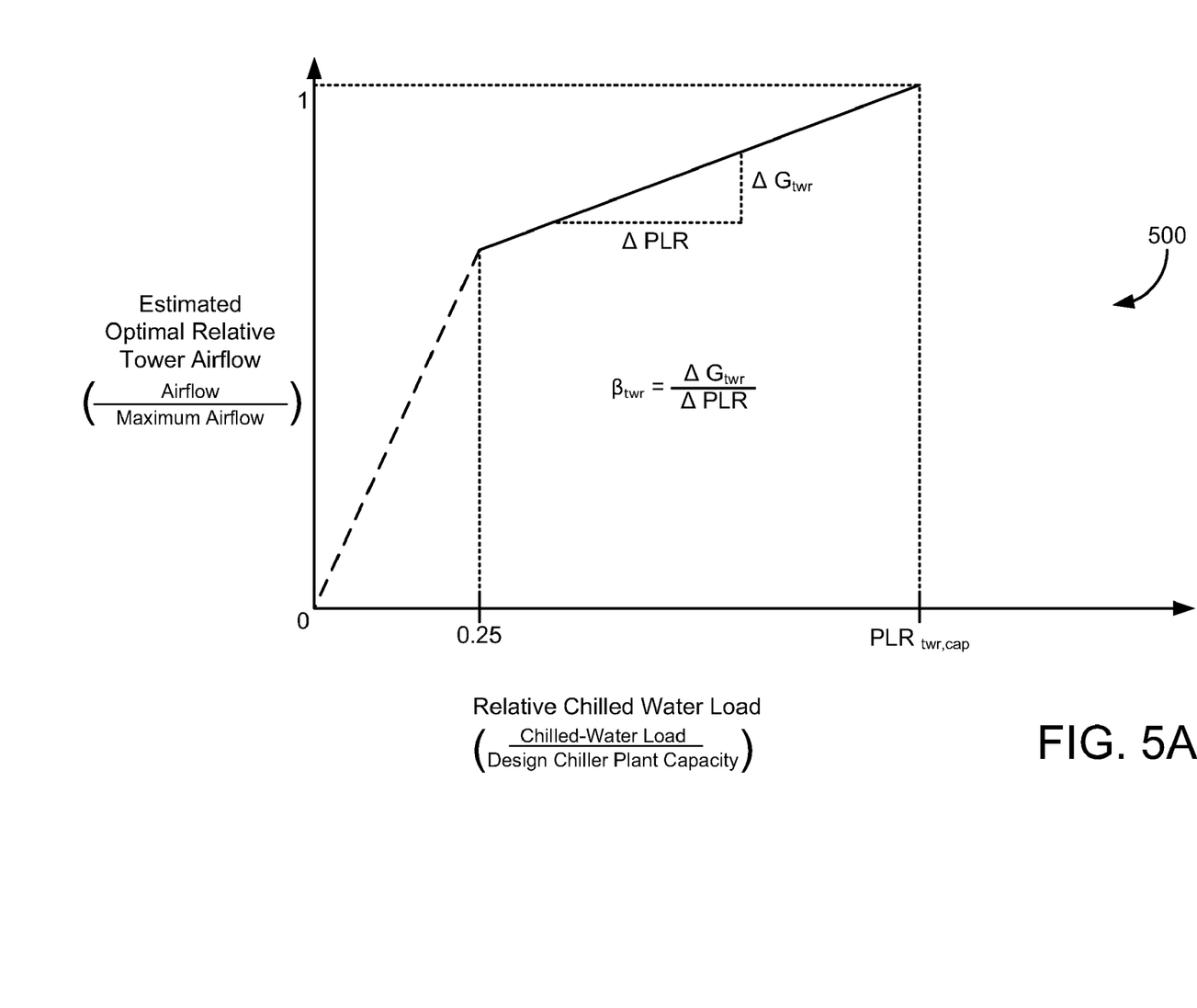
FIG. 5A is a depiction of a model for determining tower airflow as a function of a chilled water load, according to an exemplary embodiment.
Figures 5B, 5C:
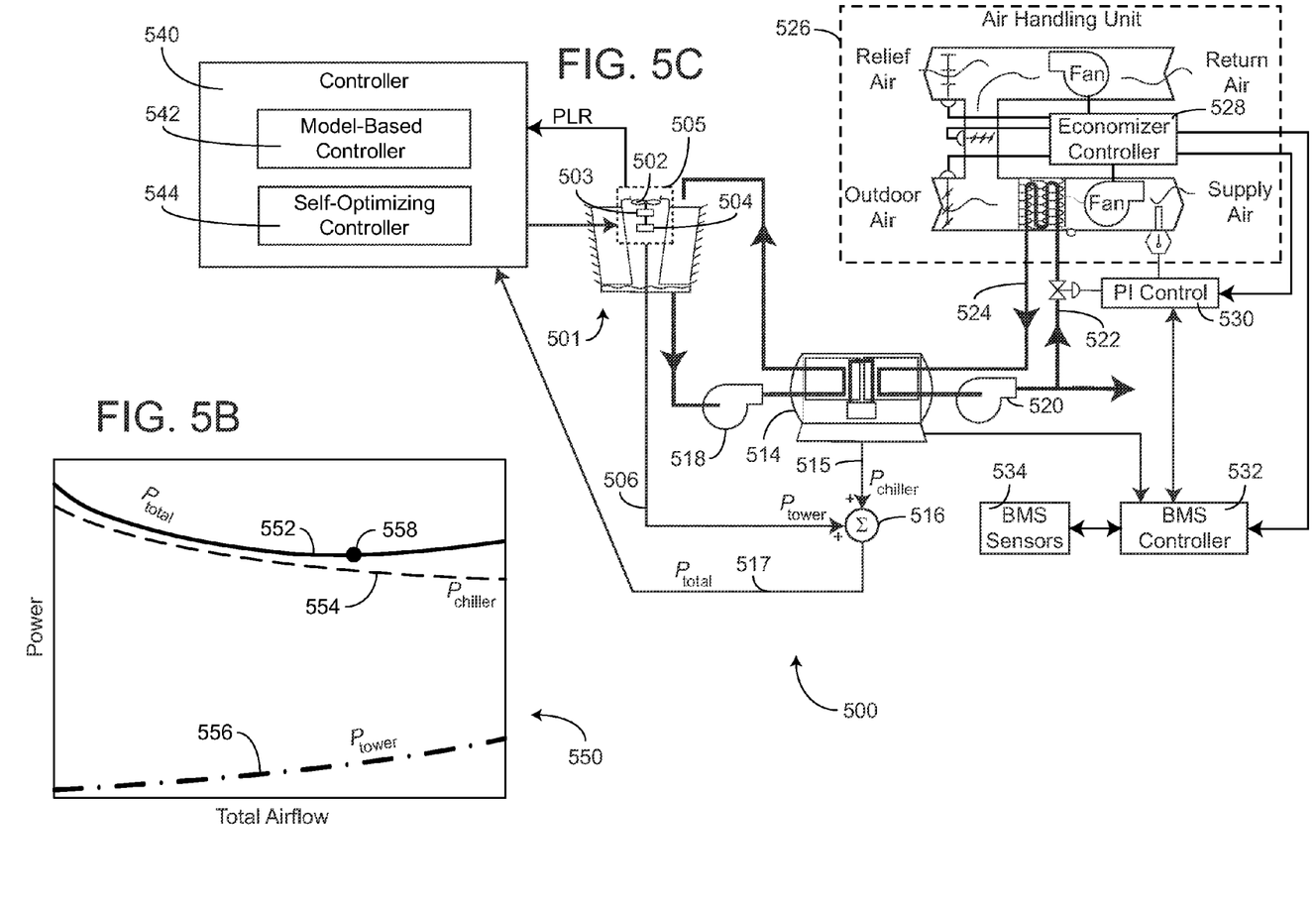
FIG. 5B is an illustration of a relationship between the cooling tower fan power and a corresponding chiller's power.
FIG. 5C is a block diagram of an HVAC system, according to an exemplary embodiment.

FIGS. 5A-5C relate to a particular implementation for one or more control systems or processes described above, according to an exemplary embodiment. Cooling towers are used to remove heat from chilled water provided to chiller condensers. Additional explanation and diagrams for exemplary cooling tower systems are contained in U.S. application Ser. No. 12/777,097. FIG. 5A depicts one model for determining tower airflow as a function of a chilled water load. Tower airflow may be computed as a linear function of the part load ratio (i.e., chilled water divided by design total chiller cooling capacity) with the following equation ("equation 1"):

$$G_{twr} = 1 - \beta_{twr}(PLR_{twr,cap} - PLR) \text{ for } 1.0 < PLR < 0.25$$

where $G_{twr}$=tower airflow divided by maximum airflow with all cells operating at high speed
PLR=chilled-water load divided by design total chiller plant cooling capacity (part-load ratio)
$PLR_{twr,cap}$=part-load ration (value of PLR) at which tower operates at its capacity ($G_{twr}$=1)
$\beta_{wr}$=slope of relative tower airflow ($G_{twr}$) versus part-load ratio (PLR)

When chiller operation is below 25% of the full load, the tower airflow is ramped to zero as the load goes to zero according to ("equation 2"):

$$G_{twr} = 4PLR[1-\beta_{twr,cap}(PLR_{twr,cap}-0.25)] \text{ for } PLR<0.25$$

The results of equation 1 or 2 are constrained between 0 and 1. The fraction of tower capacity may then be converted to fan speed, fan sequencing parameters, and other particular outputs by one or more other controllers, sequencers, or variable speed drives. Equations 1 and 2 above are described in greater detail in Chapter 41 of the 2007 ASHRAE Handbook of HVAC Applications at pages 41.12-41.15. Equations 1 and 2 are examples of open-loop or mode-based control strategies that may be switched to after learning parameters using an extremum seeking control strategy.

Referring now to FIG. 5B, an illustration of the relationship between the cooling tower fan power and the corresponding chiller's power is shown. As airflow increases, fan power increases but there is a reduction in the chiller power consumption due to a decreasing temperature of the chilled water provided to the condenser of the chiller. As is illustrated in FIG. 5B, a minimum (i.e., optimal) total power can be obtained by finding the right chiller power consumption and tower fan power consumption. U.S. application Ser. No. 12/777,097 describes systems and methods for using self-optimizing control to find the minimum total power in a system represented by FIG. 5B.

Equation 1 above for $G_{twr}$ is an open loop model where $PLR_{twr,cap}$ is one of the inputs that drives tower airflow ($G_{twr}$). $PLR_{twr,cap}$ may be adjusted to change $G_{twr}$ for a given PLR. Such an activity would move the airflow and therefore the total energy plotted in FIG. 5B.

The following procedure can be used to automatically determine an open loop parameter or parameters (e.g., $PLR_{twr,cap}$ and/or $\beta_{twr}$) for use in equation 1 or equation 2 listed above. Extremum seeking control may be used to control the cooling tower fans for an initial training period (e.g., 4 weeks, 1 week, etc.). During the training period, the part load ratio (PLR) and tower airflow divided by maximum airflow with all tower cells operating at high speed ($G_{twr}$) can be recorded (e.g., every hour, every thirty minutes, etc.). The maximum part load ratio ($PLR_{max}$) and minimum part load ratio ($PLR_{min}$) may be found and stored for the training period.

Using the training data, parameters $PLR_{twr,cap}$ and $\beta_{twr}$ may be identified using a measurement, calculation, a least squares method, or another approach. For example, if a linear line does not fit the training data, then an alternative equation (e.g., quadratic) may be used to determine the relationship between the part load ratio and relative total airflow. Other methods such as artificial neural networks or non-parametric curve estimation methods could be used to estimate the optimal tower airflow from the part-load ratio. Other descriptors such as standard deviation of the errors from the curve fit may be calculated and stored.

Once the relationship between optimal tower airflow and optimal chilled water load (e.g., in terms of $PLR_{twr,cap}$ and/or $\beta_{twr}$) are determined, control of the cooling tower can be switched from the extremum seeking controller to an open loop model-based controller operating according to equations 1 and equation 2. $PLR_{twr,cap}$ and $\beta_{twr}$ learned during the extremum seeking control are used in equations 1 and 2. $PLR_{twr,cap}$ and $\beta_{twr}$ may be considered to be the result of learning a relationship between a manipulated variable (e.g., tower airflow) and an output variable (e.g., relative chilled water load) when the relative cooling tower airflow is at a value that minimizes the total power of the chiller and fan.

When control switches from the extremum seeking controller to equations 1 and 2, and the PLR is between $PLR_{min}$ and $PLR_{max}$, then equations 1 and 2 (e.g., a model-based controller implementing equations 1 and 2) continue controlling the cooling tower in a open loop control. If the PLR is less than $PLR_{min}$ or greater than $PLR_{max}$, then the training period may be repeated and the optimal relationship between tower airflow and power may be relearned, with the relationship being communicated to the mode-based controller at the end of the extremum control using updated values for $PLR_{twr,cap}$, $\beta_{twr}$, $PLR_{min}$, and $PLR_{max}$.

Due to equipment wear, system faults, or improper maintenance, the performance of the cooling towers and chillers may be time varying. Periodically (once per week), the extremum seeking control (e.g., a shortened version of the training activity) may be used to determine a new data set for the relative chilled water load (e.g., part load ratio).

In another embodiment, whether extremum seeking control for training is desired can be determined by a main control module by estimating the PLR from equation 1. If the actual optimal air flow ratio is significantly different than the estimated optimal airflow ratio, then the performance of the chiller and the cooling tower can be estimated to have changed. In an embodiment, the standard deviation of the residuals from the least squares method can be used to determine if there is a significant difference between the estimated and actual optimal airflow ratio. The operator should be informed of the change and extremum seeking can be reinitiated to retain the system.

Referring now to FIG. 5C, a block diagram of an HVAC system 500 is shown, according to an exemplary embodiment. The HVAC system 500 is shown to include a controller 540 that is generally configured to provide an airflow command to cooling tower 501. Controller 540 includes a model-based controller 542 and a self-optimizing controller 544. In an exemplary embodiment, model-based controller 542 is configured to operate the open-loop equations 1 and 2 listed above. Self-optimizing controller 544 may be configured to use extremum seeking control to seek a total airflow parameter that results in a minimum tower fan power plus chiller power expenditure.

Self-optimizing controller 544 may be used to find parameters $PLR_{twr,cap}$ and $\beta_{twr}$ associated with a near optimal relationship between airflow (i.e., the manipulated variable) and total power (i.e., the output variable). Parameters $PLR_{twr,cap}$ and $\beta_{twr}$ can be provided to the model-based controller (e.g., at the end of a training period) as described above.

Self-optimizing controller 544 is configured to control the speed of fan 502 by providing a control signal to fan motor 503 or to a variable speed drive 504 associated with fan motor 503. Throughout this disclosure, any reference to controlling the speed of the cooling tower fan can be or include controlling the speed of the fan motor, providing an appropriate control signal to the fan motor's variable speed drive, or any other control activity that affects the cooling tower fan speed of cooling tower system 505.

Self-optimizing controller 544 determines the fan speed by searching for a fan speed (e.g., an optimum fan speed) that minimizes the sum of the power expended by cooling tower fan system 505 and the power expended by chiller 514 (e.g., power expended by the chiller's compressor). The power demand of the chiller's compressor (and/or other components) is affected by the condenser water supply temperature—the temperature of the water supplied by cooling tower 501 to chiller 514. Increasing the air flow of the cooling tower 501 (e.g., increasing the fan speed) provides a lower condenser water temperature, which reduces the chiller's power requirement (primarily the power expended by the chiller's compressor). Increasing the fan speed, however, causes an increase in tower fan power consumption. As shown in FIG. 5B, there is an optimal cooling tower air flow rate that minimizes the sum of the expended chiller power and the power expended by the cooling tower fan system.

Self-optimizing controller 544 receives an input 517 of power expended by cooling tower fan system 505 and an input 515 of power expended by chiller 514 (e.g., chiller 514's compressor). Self-optimizing controller 544 implements an extremum seeking control strategy that dynamically searches for an unknown input (e.g., optimal tower fan speed) to obtain system performance (e.g., power expended by the cooling tower and the chiller) that trends near optimal. Self-optimizing controller 544 operates by obtaining a gradient of process system output (e.g., power expended by the cooling tower and the chiller) with respect to process system input (fan speed) by slightly perturbing or modulating the fan speed and applying a demodulation measure to the output. Self-optimizing controller 544 provides control of the process system (e.g., the fan speed and therefore the tower and chiller power demand) by driving the obtained gradient toward zero using an integrator or another mechanism for reducing a gradient in a closed-loop system.

Inputs 506 and 515 may be summed outside of self-optimizing controller 544 via summing block 516 to provide combined signal 517 (e.g., which may be representative of total power demand of tower fan system 505 and chiller 514). In various other embodiments, self-optimizing controller 544 conducts the summation of summing block 516. In either case, self-optimizing controller 544 can be said to receive inputs 506 and 515 (even if inputs 506 and 515 are provided as a single summed or combined signal 517).

Chiller 514 is shown as a simplified block diagram. Particularly, chiller is shown to include a condenser, an evaporator, a refrigerant loop, and a compressor. Chiller 514 also includes at least one expansion valve on its refrigerant loop between the condenser and the evaporator. Chiller 514 can also include any number of sensors, control valves, and other components that assist the refrigeration cycle operation of chiller 514.

A chilled fluid pump 520 pumps the chilled fluid through the loop that runs through the building (e.g., through piping 522 and 524, through chiller 514, and to one or more air handling units 526). In the embodiment shown in FIG. 5C, the chilled fluid is supplied via piping 522 to an air handling unit 526 that is an economizer type air handling unit. Economizer type air handling units vary the amount of outdoor air and return air used by the air handling unit for cooling. Air handling unit 526 is shown to include economizer controller 528 that utilizes one or more algorithms (e.g., state based algorithms, extremum seeking control algorithms, etc.) to affect the actuators and dampers or fans of air handling unit 526. The flow of chilled fluid supplied to air handling unit 526 can also be variably controlled and is shown in FIG. 5C as being controlled by proportional-integral (PI) control 530. PI control 530 can control the chilled fluid flow to air handling unit 526 to achieve a setpoint supply air temperature. Economizer controller 528, a controller for chiller 514, and PI control 530 can be supervised by one or more building management system (BMS) controllers 532. BMS controller 532 can use BMS sensors 534 (connected to BMS controller 532 via a wired or wireless BMS or IT network) to determine if the setpoint temperatures for the building space are being achieved. BMS controller 532 can use such determinations to provide commands to PI control 530, chiller 514, economizer controller 528, or other components of the building's HVAC system.

In an exemplary embodiment, self-optimizing controller 544 does not receive control commands from BMS controller 532 or does not base its output calculations on an input from BMS controller 532. In other exemplary embodiments self-optimizing controller 544 receives information (e.g., commands, setpoints, operating boundaries, etc.) from BMS controller 532. For example, BMS controller 532 may provide self-optimizing controller 544 with a high fan speed limit and a low fan speed limit. A low limit may avoid frequent component and power taxing fan start-ups while a high limit may avoid operation near the mechanical or thermal limits of the fan system.

While controller 540 is shown as separate from BMS controller 532, controller 540 may be integrated with BMS controller 532. For example, controller 540 may be a software module configured for execution by a processor of BMS controller 532. In such an embodiment, the inputs of expended chiller power 515 and tower system fan power 506 may be software inputs. For example, software executed by BMS controller 532 may use model-based calculations to determine the expended power. The models may relate, for example, fan speed to power expended by cooling tower fan system 505 and, for example, compressor pump speed to power expended by chiller 514. In yet other exemplary embodiments the inputs of expended power may be "real" (e.g., a current sensor coupled to the power input of variable speed drive 504 of cooling tower fan system 505 may be wired to an input of controller 540 or self-optimizing controller 544, summing element 516, or BMS controller 532, and a current sensor coupled to the power input of the variable speed compressor motor may be wired to another input of controller 540, summing element 516, or BMS controller 532).

Where air handling unit 526 is an economizer, one or more controllers as described herein may be used to provide for control of air handling unit 526 during one or more of the operational states of the economizer. For example, economizer controller 528 may include an extremum seeking controller or control module configured to utilize an extremum seeking control strategy to change the position of one or more outdoor air actuators or dampers. One or more of the systems and methods described with reference to FIGS. 1-4 may be implemented in or by economizer controller 528.

Other exemplary embodiments may include a configuration different than that shown in FIG. 5C. In such different configurations, for example, additional or different inputs or outputs may be used by controller 540. For example, controller 540 may manipulate one or more variables of chiller 514 or pump 518 alone or in concert with one or more manipulated variables for cooling tower system 505. Power expenditures of chiller 514, pump 518, cooling tower system 505 and/or other cooling system outputs may all be summed at element 516. One or more of the manipulated variables may be adjusted by self-optimizing controller 544 to seek an optimal aggregate power expenditure. Accordingly, a single or multi-variable steady state relationship may be learned by self-optimizing controller 544 and used by model-based controller 542 after a switch from the self-optimizing controller to the model-based controller 542 occurs.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A system for controlling a cooling tower that cools condenser fluid for a condenser of a chiller, comprising:
a cooling tower fan system that controllably varies a speed of at least one fan motor;
an extremum seeking controller that receives inputs of power expended by the cooling tower fan system and of power expended by the chiller, wherein the extremum seeking controller provides an output to the cooling tower fan system that controls the speed of the at least one fan motor, wherein the extremum seeking controller determines the output by searching for a speed of the at least one fan motor that minimizes the sum of the power expended by the cooling tower fan system and the power expended by the chiller;
a model-based controller for controlling the speed of the at least one fan motor;
a processing circuit configured to store process characteristics associated with a steady-state of the extremum seeking controller;
wherein the processing circuit is further configured to switch from using the extremum seeking controller to using the model-based controller to control the fan speed and wherein the processing circuit operates the model-based controller using the stored process characteristics.

2. The system of claim 1, wherein the processing circuit is configured to use the extremum seeking controller during an initial training period.

3. The system of claim 2, wherein the stored process characteristics associated with the steady state of the extremum seeking controller and used by the model-based controller comprise the part-load ratio at which the cooling tower operates at its capacity and the slope of the relative cooling tower airflow versus the part-load ratio.

4. The system of claim 3, wherein the processing circuit is configured to store the maximum part load ratio ($PLR_{max}$) during the training period and the minimum part load ratio ($PLR_{min}$) during the training period.

5. The system of claim 4, wherein the processing circuit is configured to monitor the part load ratio during the model-based control and wherein the processing circuit is configured to switch back to using the extremum seeking controller if the part load ratio exceeds $PLR_{max}$ or drops below $PLR_{min}$ during operation using the model-based controller.

* * * * *